H. W. LODER.
ADJUSTABLE EGG TRAY STOP.
APPLICATION FILED JUNE 5, 1917.

1,245,747.

Patented Nov. 6, 1917.

WITNESSES

INVENTOR
H. W. Loder.
BY
ATTORNEYS

UNITED STATES PATENT OFFICE.

HOWARD WILLIAMS LODER, OF TOWACO, NEW JERSEY.

ADJUSTABLE EGG-TRAY STOP.

1,245,747.  Specification of Letters Patent.  Patented Nov. 6, 1917.

Application filed June 5, 1917. Serial No. 172,896.

*To all whom it may concern:*

Be it known that I, HOWARD W. LODER, a citizen of the United States, and a resident of Towaco, in the county of Morris and State of New Jersey, have invented a new and Improved Adjustable Egg-Tray Stop, of which the following is a full, clear, and exact description.

This invention relates to an attachment for incubator egg trays, it being in the nature of a stop for holding the eggs compactly together when the tray is only partially filled, so that the entire lot of eggs can be turned at once into another tray without the individual eggs promiscuously turning.

The invention has as its general objects to provide a device of this character which is of comparatively simple and inexpensive construction, reliable and efficient in use, and so designed that it can be adjusted within certain limits to the number of eggs in the tray.

A more specific object of the invention is the provision of an egg tray stop which has adjustably connected members arranged to engage the ends of the tray so that the stop will hold the eggs compactly together or in contact, the stop device being so designed that it will engage in the empty tray placed on top of the egg-containing tray, so that when the trays are reversed the eggs and stop will be deposited in the formerly empty tray. If desired, an adjustable stop may be arranged in each end of the tray so as to confine the eggs in the center.

With such objects in view, and others which will appear as the description proceeds, the invention comprises various novel features of construction and arrangement of parts which will be set forth with particularity in the following description and claims appended hereto.

Figure 1:
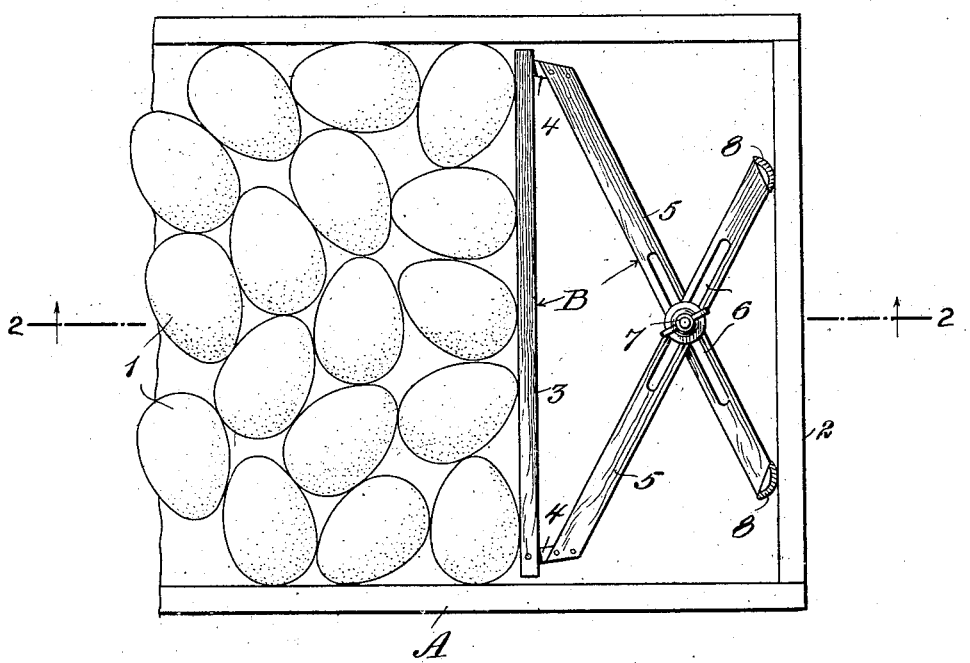
Figure 2:
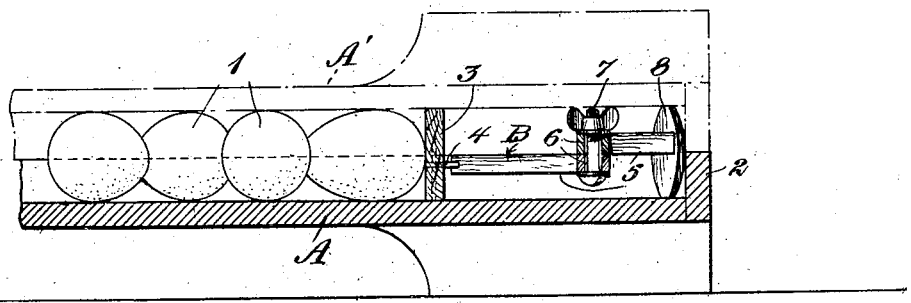

In the accompanying drawing, which illustrates one embodiment of the invention and wherein similar characters of reference indicate corresponding parts in both the views, Figure 1 is a plan view of one end of the egg tray with eggs and an adjustable stop therein; and Fig. 2 is a vertical section on the line 2—2, Fig. 1, with an empty tray shown by broken lines on top of the egg-containing tray.

Referring to the drawing, A designates an ordinary egg tray in which are the eggs 1 to be hatched, and in the egg tray is an adjustable stop B which is interposed between the eggs and the end wall 2 of the tray. This stop comprises a partition strip 3 which has connected thereto at its outer ends by hinges 4 the crossing brace strips or legs 5. These strips have longitudinal slots 6 through which passes a clamping bolt 7. On the free extremities of the strips 5 are cross pieces or feet 8 which are of the same vertical dimension as the partition 3. In fact, the partition 3 and cross pieces 8 are twice the depth of a tray, so that when the empty tray A', Fig. 2, is placed on the tray A containing the eggs, the stop device will engage in both trays and insure registering thereof, and furthermore, the stop device is kept level and firmly in position normally, and while the trays are being turned. When the trays in Fig. 2 are turned, the eggs and stop device are deposited from the tray A to the tray A', and the eggs are prevented from individually turning, because they are clamped in contact with each other. The stop device can be adjusted easily and quickly according to the number of eggs in the tray, and by the use of the stop device the eggs can be easily and quickly turned, thereby avoiding the annoyance and time usually required in hand turning.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of an egg tray, an adjustable stop therein comprising a partition extending across the tray and having a thickness substantially equal to twice the depth of the tray, and adjustable members on the partition and adapted to engage an outer wall of the tray.

2. The combination of an egg tray, an adjustable stop therein comprising a partition extending across the tray, and adjustably connected crossing members on the partition and adapted to engage an outer wall of the tray, said stop device being twice as thick as the depth of the tray.

3. An adjustable stop device for incubator egg trays, comprising an egg-engaging member, crossing members hingedly connected therewith and having longitudinal slots at the point of crossing, and a fastener passing through the slots for adjustably connecting the members in crossing relation.

4. An adjustable stop device for incubator egg trays, comprising an egg-engaging member, crossing members hingedly connected therewith, means for adjustably connecting the members in crossing relation, and cross pieces on the outer ends of the crossing members, with the upper and lower edges of the cross pieces in the same plane with the upper and lower edges of the egg-engaging member, said cross pieces serving to hold the egg-engaging face of the first-mentioned member at substantially right-angles to the plane of the bottom of the tray.

5. An adjustable egg stop for incubator trays, comprising an egg-engaging member, hinges on the ends thereof, members connected with the hinges and crossing each other, said crossing members having longitudinal slots, a clamping bolt passing through the slots, and cross pieces on the outer ends of the crossing members, said pieces having their upper and lower ends in substantially the same plane with the upper and lower edges of the egg-engaging member.

HOWARD WILLIAMS LODER.

Copies of this patent may be obtained for five cents each, by addressing the "Commissioner of Patents, Washington, D. C."